United States Patent [19]

Fink et al.

[11] 3,782,742
[45] Jan. 1, 1974

[54] THREE JAW CHUCK APPLICATION

[75] Inventors: Anton Fink, Albertson; Harold Wentworth, Lake Grove, both of N.Y.

[73] Assignee: Metrology Systems Corp., Plainview, N.Y.

[22] Filed: Dec. 27, 1971

[21] Appl. No.: 212,483

[52] U.S. Cl................... 279/110, 279/116, 279/117
[51] Int. Cl............................................. B23b 31/16
[58] Field of Search...................... 279/121, 110, 66, 279/117, 116

[56] References Cited
UNITED STATES PATENTS

| | | | |
|---|---|---|---|
| 3,679,221 | 6/1970 | Behrens | 279/110 |
| 3,704,022 | 11/1972 | Blattry | 279/121 |
| 1,452,034 | 3/1923 | Forkardt | 279/117 |

*Primary Examiner*—Gil Weidenfeld
*Attorney*—Leonard H. King

[57] ABSTRACT

A chuck adapted to be mounted on a machine tool such as a lathe or the like is provided with three radially movable jaws. The jaws are displaced by cam means that engage each of the jaws and move transversely thereto. A rotatable housing is coupled to the cam means in order to move the cam means in a chord-wise direction and thereby displace the jaws in a radial direction.

25 Claims, 9 Drawing Figures

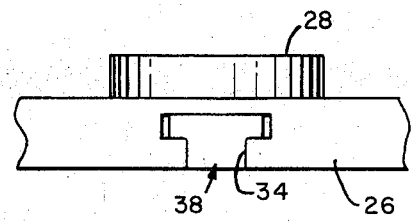
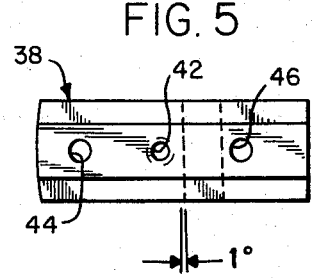
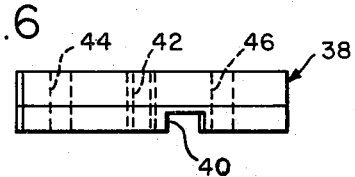
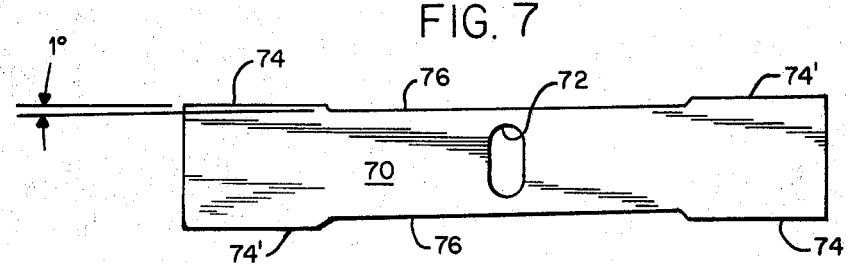
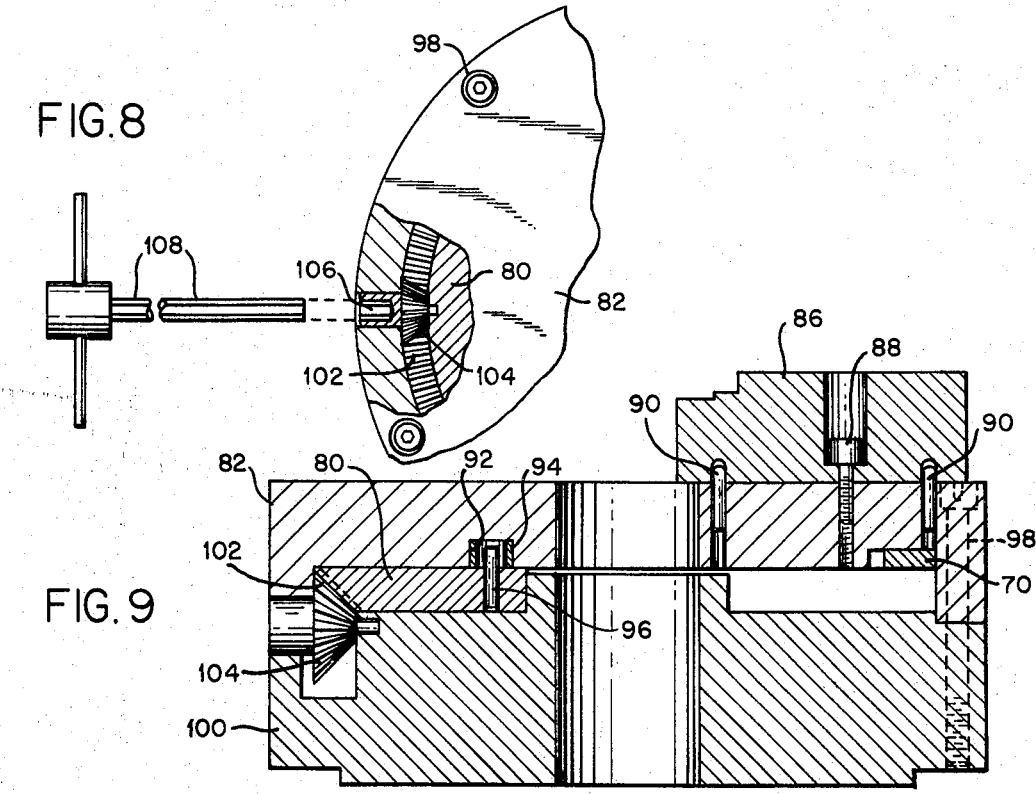

THREE JAW CHUCK APPLICATION

The aforementioned Abstract is neither intended to define the invention of the application which, of course, is measured by the claims, nor is it intended to be limiting as to the scope of the invention in any way.

This invention relates generally to the machine tool arts and, more particularly, to an improved chuck adapted to releasably grip a workpiece, a tool or the like.

BACKGROUND OF THE INVENTION

In the machine tool arts it is essential that any chuck used be rigid, have adequate holding power and be relatively simple to actuate. All of the foregoing requirements must be incorporated in a tool that is economical to fabricate and to purchase. The present invention meets the requirements of the art and provides novel structure for simultaneously actuating three radially moveable jaws.

On conventional chucks, the chuck jaws are generally activated by means of a scroll (a rotating disc which has a spiral cut into its face). Because the curvature of the groove changes with increasing or decreasing diameter, the mating slots in the jaws are made to allow for this, with the result that there is a poor fit, actually a point contact, subject to rapid wear. The present device employs a cam arrangement which permits accuracies in the order of 0.0001 inch.

In its broadest aspect, the present invention provides a body portion that is rotatable about the longitudinal axis of the chuck. The body portion is provided with actuating means for radially moving the three workpiece or tool gripping jaws. Cam means are coupled to the actuating means and are used to displace the three jaws. As the body portion is rotated, the cam means are displaced in a chord-wise direction, in a plane perpendicular to the axis of the chuck, and thereby move the jaws either inwardly or outwardly depending upon the direction of rotation of the body portion.

In one embodiment of the present invention, the body portion is knurled so that it may be hand tightened. In another embodiment, the body may be rotated by means of a spanner wrench engaged in one of the radially directed holes provided in the peripheral rim of the body portion. It will be evident that flats may be formed on the periphery of the body portion so that an open ended wrench may also be used. In an alternative embodiment of the present invention a bevel gear is formed on the periphery of the body portion and a mating, bevel pinion is journaled in the chuck. The pinion includes a radially directed socket in which a wrench is adapted to be received whereby when the pinion is rotated, the bevel gear is driven and the body portion is thus rotated to function in the manner described hereinabove, in connection with the first embodiment.

Accordingly, it is an object of the present invention to provide an improved chuck.

Another object of the present invention is to provide an improved chuck wherein the radially moveable jaws are displaced by cam means moving in a chord-wise direction.

It is a further object of the present invention to provide an improved chuck, as described above, wherein the cam means are displaced by a rotatable body portion.

A further object of the present invention is to provide an improved chuck, as described above, wherein the rotatable body portion is moved by a key through a gear train.

These and other objects, features and advantages of the invention will, in part, be pointed out with particularity, and will, in part, become obvious from the following more detailed description of the invention, taken in conjunction with the accompanying drawing, which forms an integral part thereof.

DESCRIPTION OF THE DRAWING

In the various figures of the drawing, like reference characters designate like parts. In the Drawing:

FIG. 4 is a fragmentary, side elevational view taken along line 4—4 of FIG. 3;

FIG. 5 is a plan view of one of the slides on which the jaws of the present invention are mounted;

FIG. 6 is a side elevational view of the slide shown in FIG. 5;

FIG. 7 is a plan view of the cam means comprising the present invention;

FIG. 8 is a fragmentary end elevational view illustrating an alternative embodiment of the present invention; and FIG. 9 is a sectional view, similar to FIG. 2, illustrating the alternative embodiment shown in FIG. 8.

Figure 1:
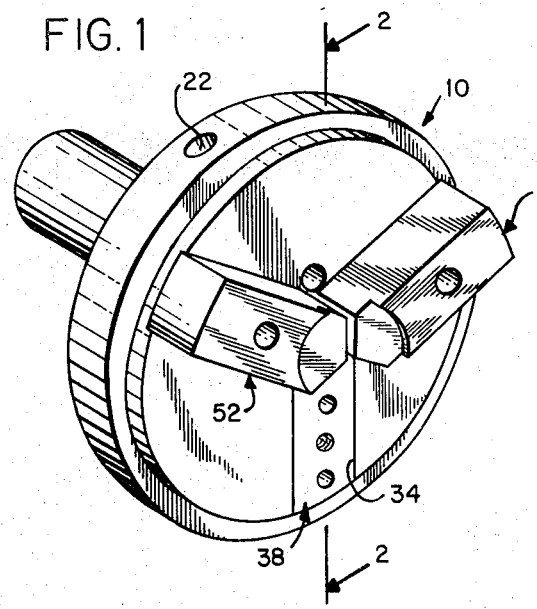
FIG. 1 is a perspective view of the present invention with one of the jaws removed for clarity.

Referring first to FIGS. 1–4, there is shown one embodiment of the chuck 10 comprising the present invention. There is provided a body portion generally designated by the reference character 12 which includes a circumferential rim 14 and a web section 16 extending radially inwardly therefrom. An enlarged, central bore 18 is provided in the web 16 as are three axially extending pins 20 whose function will be described hereinafter. Three arcuate, elongated slots 21 are also formed in the web 16.

The rim 14 is preferably knurled to permit hand tightening. Where an extremely tight clamping action is required, a spanner wrench may be employed. For this purpose, a plurality of radially extending holes 22 (only one of which is shown in FIG. 1) are provided.

Alternatively, a plurality of flats may be provided on the peripheral rim 14 so that the body portion 12 may be rotated by means of an open-ended wrench.

Another major component of the present invention is the cover member designated generally by the reference character 26. Three counterbored holes 27, equally spaced apart on a common diameter are formed through the cover member 26. The central bore 18 is the body portion 12 is sized to snugly receive a centrally located boss 28 having, on a common diameter, three equally spaced apart counterbored holes 30 formed therethrough. A central bore 32 is also formed through the boss 28. Three radially oriented key-shaped slots 34 (FIG. 3 and FIG. 4) are also formed in the cover member 26 extending inwardly from the periphery thereof and terminating at the central bore 32. Three additional slots 36 are formed in an end face of the cover member 26 such that the axis of each of the slots 36 is perpendicular to the axis of its respective slot 34. As shown particularly in FIG. 3, the slots 36 extend in a chord-wise direction relative to the axis of the central bore 32 and in a plane perpendicular thereto.

A slide member, such as generally designated by the reference character 38 and as shown in FIGS. 5 and 6, is positioned in each of the T-shaped slots 34. Each of the slide members 38 are T-shaped in cross section and, through the widest portion thereof, is provided with a slot 40 whose axis is not quite perpendicular to the longitudinal axis of the slide member 38. In the embodiment illustrated the slot 40 is off of the true perpendicular by approximately two degrees for a purpose which will become evident hereinafter. Three axially spaced holes 42, 44 and 46 are formed through the slide member 38. The central hole 42 is tapped but the two outboard holes 44 and 46 are not. Locating pins 48 and 50 are pressfit into the openings 44 and 46, respectively.

A workpiece or tool clamping jaw, generally designated by the reference character 52, is mounted on each of the slide members 38. Each jaw 52 is provided with a counterbored hole 54 in which is positioned a screw 55 whose threads engage the tapped hole 42 in each of the slides 38. Each of the jaws 52 are further provided with blind holes 56 and 58 positioned so as to receive the locating pins 48 and 50, respectively.

Figure 2:
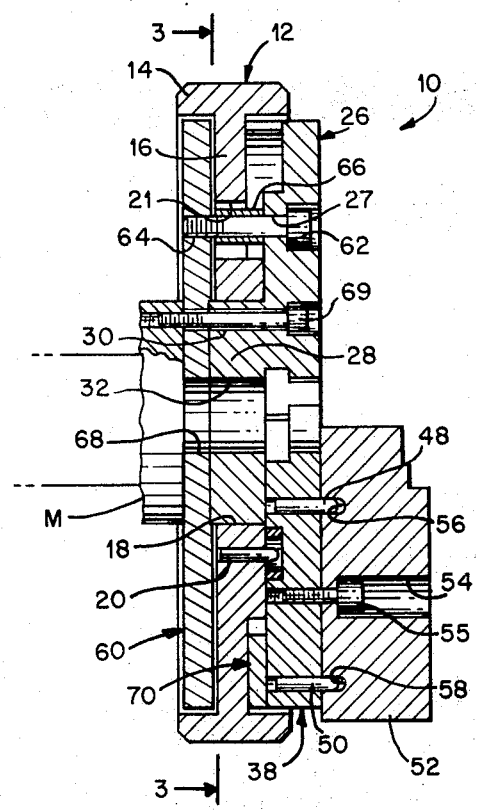
FIG. 2 is a sectional elevational view taken along line 2—2 of FIG. 1.

An end plate, generally designated by the reference character 60, is secured to the assembly by means of three screws 62 that are positioned in the counterbored holes 27. The end plate 60 includes three tapped holes 64 on a common diameter for receiving the screws 62. As shown in FIG. 2, a hardened sleeve 66 is positioned about each of the screws 62 and each of the sleeves 66 extend through one of the arcuate slots 21 formed in the web 16 of the body member 12. The end plate 60 is further provided with a central bore 68 that is coaxial with the central bore 32 of the cover member 26. Screws 69 that extend through the holes 30 in the cover 26 as well as aligned holes in the end plate 60 are used to secure the chuck 10 in the machine M.

Figure 3:
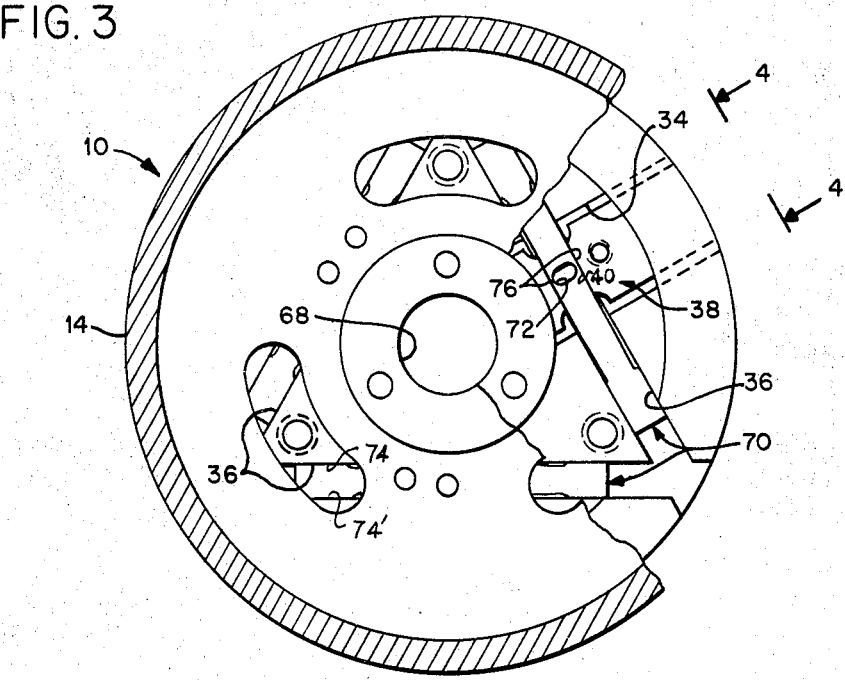
FIG. 3 is a transverse, sectional view taken along line 3—3 of FIG. 2.

In each of the slots 36 there is provided a flat cam generally designated by the reference character 70 (FIGS. 2, 3 and 7). The cam 70 is provided with an elongated, centrally located opening 72 whose major axis is perpendicular to the longitudinal axis of the cam 70. As shown in FIG. 2, for example, the pins 20 are received in the slots 72. A pair of opposed bearing surfaces 74, 74' are formed on opposite sides and opposite ends of the cam 70 and are arranged to engage the side walls of the slot 36. Intermediate the ends 74, 74' the side edges 76 of the cam 70 are offset by an angle of approximately 1°. The surfaces 74 and 74' are parallel to each other and of the same length.

Only a very slight angular displacement of the body portion 12 is required to move the jaws 52 in a radial direction to either grasp or release the workpiece or tool. As the body portion 12 is rotated, by means of a spanner wrench engaging the radially disposed openings 22 in the first embodiment, the cover 26 and the end plate 60 remain fixed with respect to each other and with respect to the machine M. However, since the pins 20 are moving arcuately, they will displace the cams 70 in a chord-wise direction and the angular cam surfaces 76 will bear against the side walls of the slot 40 in the slides 38. Since the cams 70 are constrained within and by the side walls of the slots 36 and since the slot 72 in each cam 70 is elongated, the arcuate displacement of the pins 20 will be converted into axial movement of the cams 70 to thereby cause a slight radial displacement of the slides 38 and hence the jaws 52. It will be appreciated that, because the actuating force is applied to the periphery 14 of the body portion 12, a mechanical advantage will be achieved in the jaws 52. Further, the interaction of cam surfaces 76 and the slots 40 takes advantage of the inclined plane effect and, with a minimal external actuating force, applies a substantial gripping force to the jaws 52.

FIGS. 8 and 9 illustrate an alternative embodiment of the present invention. As in the previous embodiment there is provided a body portion 80, a cover 82, three radially moveable slides 84 secured to the cover 82 in the manner described hereinabove, and a jaw 86 secured to each slide 84 by means of a screw 88 and the locating pins 90. The cover 82 is provided with slots 92 that are functionally equivalent to the slots 36 in the first embodiment. A cam member 94 similar to that described in connection with the first embodiment is received in each slot 92 and a pin 96 is received in each cam member 94. As in the previous embodiment, the pin 96 is rigidly secured to the body 80. Screws 98 are used to secure the cover 82 to an end plate 100 and to capture the body portion 80 therebetween.

The body portion 80 is provided with a bevel gear 102 on the periphery thereof that is angularly displaced by a mating bevel pinion 104 that is journaled in the end plate 100. The bevel pinion 104 is provided with a socket 106 (FIG. 8) at its radially outer end so as to receive a key 108. Thus, when the key 108 and the bevel pinion 104 are rotated, the body portion 80 will be rotated as well through the mating gear 102. The rotation of the body portion 80 causes chordwise movement of the cams 94 and thus provides for radial displacement of the slides 84 and the jaws 86.

There has been disclosed heretofore the best embodiment of the invention presently contemplated. However, it is to be understood that various changes and modifications may be made thereto without departing from the spirit of the invention.

What we claim as new and desire to secure by letters Patent is:

1. An improved chuck for holding an article such as a workpiece or a tool, said chuck comprising:
    a. a rotatable body portion having actuating means integral therewith said body portion comprising an annular rim having a web portion extending radially inward therefrom, said actuating means comprising a plurality of angularly spaced-apart, axially extending pins;
    b. cam means coupled to said actuating means by said extending pins, said cam means being arranged to move in a generally chordwise direction and in a plane substantially perpendicular to the axis of said chuck when said body portion is rotated; and
    c. jaw means radially moveable in response to the chordwise movement of said cam means whereby said jaw means are adapted to releasably engage the article to be held by said chuck.

2. The chuck in accordance with claim 1 wherein said rim includes at least one, substantially radially extending opening for receiving a wrench.

3. The chuck in accordance with claim 1 and further including a cover member that is non-rotatable relative to said body portion, said cover member including a first plurality of slots for slidably receiving said jaw means and a second plurality of slots for slidably receiving said cam means.

4. The chuck in accordance with claim 3 wherein said first plurality of slots and said jaw means are T-shaped in cross section.

5. The chuck in accordance with claim 3 wherein said jaw means further includes third slot means that is substantially contiguous with said second slot in said body portion.

6. The chuck in accordance with claim 5 wherein the side walls of said third slot means are positioned at an angle with respect to the side walls of said second slots.

7. The chuck in accordance with claim 5 wherein said cam means comprises a plate having first and second sections, the side walls of said first section being substantially parallel to and received between the side walls of said second slots, the side walls of said second section being at an angle to the side walls of said end portions.

8. The chuck in accordance with claim 7 wherein said second section of each said cam means includes a radially oriented, elongated opening for receiving said actuating means.

9. The chuck in accordance with claim 3 wherein each said jaw means comprises a slide member coupled to said actuating means and a jaw member removably secured to each said slide member.

10. The chuck in accordance with claim 3 wherein there is further included an end plate and fastener means for securing said cover member to said end plate with said web of said body portion positioned therebetween, said web of said body portion including at least one elongated arcuate opening for loosely passing said fastener means therethrough.

11. The chuck in accordance with claim 1 wherein said body portion includes first gear means integral with the periphery thereof, second gear means in meshing engagement with said first gear means and means for rotatably journaling said second gear means.

12. The chuck in accordance with claim 11 wherein said first and said second gear means are, respectively, a bevel gear and a bevel pinion.

13. The chuck in accordance with claim 11 wherein the axis of said second gear means is radially oriented and includes a socket for receiving a wrench.

14. An improve chuck for holding an article such as a workpiece or a tool, said chuck comprising:
a. a rotatable body portion having a central bore;
b. a cover member including a boss positioned in said central bore, a first plurality of slots formed radially in one end face of said cover member and a second plurality of chordwise slots intersecting said first plurality of radial slots;
c. a slide member positioned in each of said first plurality of slots, each said slide member having a third slot therein including side walls that are generally transverse but not perpendicular to said first slot;
d. a jaw secured to each said slide member;
e. cam means positioned in each of said second and third plurality of slots said cam means being arranged to bear against the side walls of said third slots; and
f. means for coupling said body portion and said cam means whereby rotation of said body portion causes said cam means to move chordally and thereby radially displace said slides and said jaws secured thereto.

15. The chuck in accordance with claim 14 wherein said body portion comprises an annular rim having a web portion extending radially inward therefrom, said actuating means comprising a plurality of angularly spaced-apart, axially extending pins arranged to engage said cam means.

16. The chuck in accordance with claim 15 wherein said rim includes at least one substantially radially extending opening for receiving a wrench.

17. The chuck in accordance with claim 14 wherein each of said first plurality of slots and each of said slide members are T-shaped in cross section.

18. The chuck in accordance with claim 14 wherein said third slot means are substantially contiguous with said second slot means.

19. The chuck in accordance with claim 18 wherein the side walls of said third slot means are positioned at an angle with respect to the side walls of said second slots.

20. The chuck in accordance with claim 14 wherein said cam means comprises a plate having first and second sections, the side walls of said first section being substantially parallel to and received between the side walls of said second slots, the side walls of said second section being at an angle to the side walls of said end portions.

21. The chuck in accordance with claim 20 wherein said second section of each said cam means includes a radially oriented, elongated opening for receiving said actuating means.

22. The chuck in accordance with claim 14 wherein there is further included an end plate and fastener means for securing said cover member to said end plate with said body portion positioned therebetween, said web of said body portion including at least one elongated arcuate opening for loosely passing said fastener means therethrough.

23. The chuck in accordance with claim 14 wherein said body portion includes first gear means integral with the periphery thereof, second gear means in meshing engagement with said first gear means and means for rotatably journaling said second gear means.

24. The chuck in accordance with claim 23 wherein said first and said second gear means are, respectively, a bevel gear and a bevel pinion.

25. The chuck in accordance with claim 23 wherein the axis of said second gear means is radially oriented and includes a socket for receiving a wrench.

* * * * *